May 18, 1926.
N. T. ALBRIGHT
VENTILATOR
Filed May 25, 1925
1,585,323
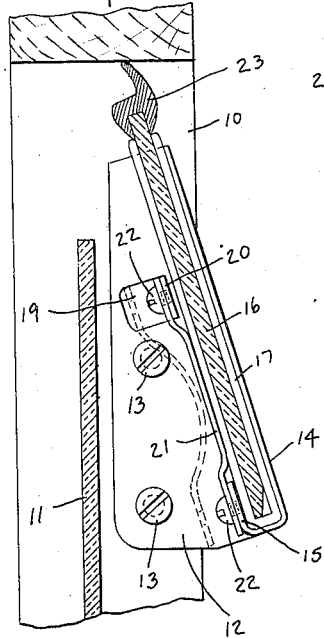
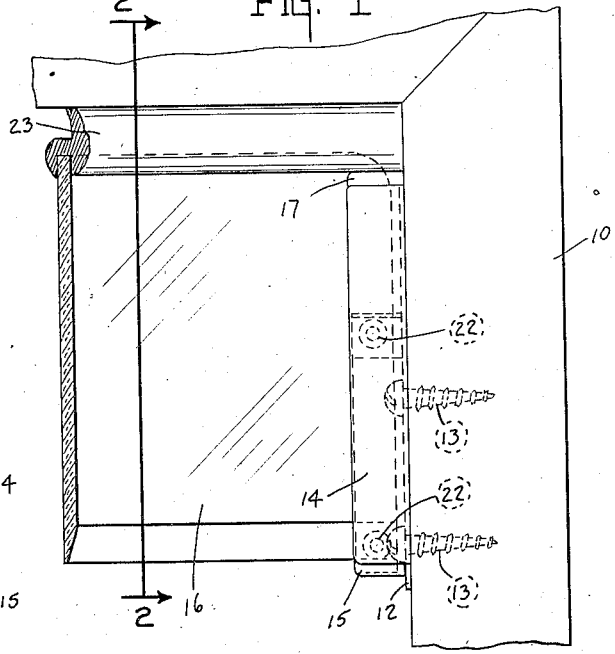
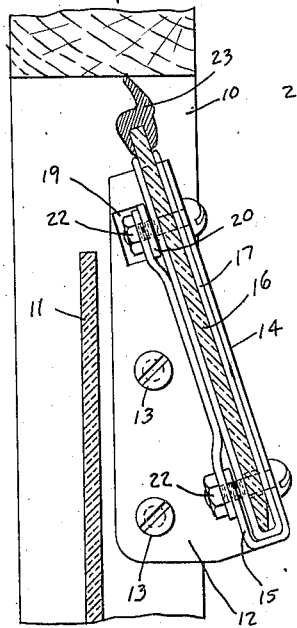
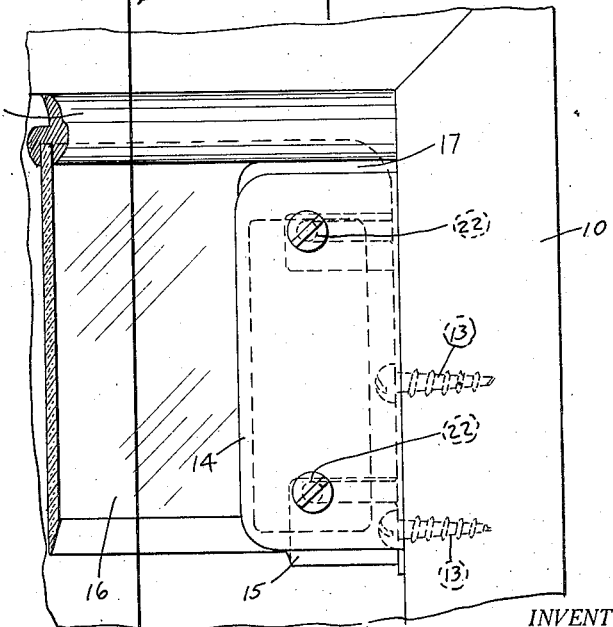
INVENTOR.
NEIL T. ALBRIGHT.
BY
ATTORNEYS.

Patented May 18, 1926.

1,585,323

UNITED STATES PATENT OFFICE.

NEIL T. ALBRIGHT, OF KOKOMO, INDIANA, ASSIGNOR TO KOKOMO AUTOMOTIVE MFG. CO., OF KOKOMO, INDIANA, A CORPORATION.

VENTILATOR.

Application filed May 25, 1925. Serial No. 32,694.

This invention pertains to ventilators for closed automobiles, and particularly adapted for mounting in connection with the doors and windows thereof.

One object of the invention resides in the means for resiliently clamping the glass plate of the ventilator in the supporting brackets so as to completely seal the same and prevent the elements passing about the edges.

Another object of the invention resides in the means for securing the ends of the glass ventilator plate in the brackets so as to be adjustable therein for permitting longitudinal adjustment thereof for enabling the ventilator to be conveniently fitted to doors or windows of varying widths.

The full nature of the invention will be understood from the accompanying drawings and the following description and claims.

Fig. 1 is an elevation view of the ventilator showing a portion thereof secured in position with respect to a window frame. Fig. 2 is a section taken on the line 2—2 of Fig. 1. Fig. 3 is the same as Fig. 1 showing another form thereof for permitting adjustment. Fig. 4 is a section taken on the line 4—4 of Fig. 3.

In the drawings there is shown a window frame 10 such as is used in connection with automobile doors or windows, and a glass closure 11 of the usual form mounted therein so as to be capable of lowering or raising from the bottom toward the top.

The ventilator comprises the side brackets 12 in the form of sheet metal angular plates which are adapted to be screw securely to the inner side surface of the frame 10 by the screws 13. Said side bracket is provided with an inwardly turned flange 14 which, as shown in Figs. 1 and 2, is relatively narrow, and as shown in Figs. 3 and 4, is relatively wide. Said flange 14 is formed with an upwardly turned U-shaped lip 15 in which the glass plate or shield 16 is adapted to seat. Surrounding the edge of the glass plate there is a cushion 17 which may be formed of rubber or any other suitable material, said cushion extending along both edges and around the bottom edge of the glass.

A portion of the end bracket 12 is cut away as at 19 so as to form a rigid inwardly extending ear 20 spaced from the flange 14 so as to receive the glass and binding strip 17 therebetween.

For resiliently clamping the glass in place there is a securing strip or plate 21 which is normally bowed so that when placed against the edge of the glass with the cushion strip 17 therebetween, its ends will normally curve outwardly. Upon the ends being secured by the screws 22 to the bracket 12 or parts thereof, said securing strip or plate 21 will be brought into clamping position so as to lie directly against the strip 17 on the inner side of the plate as shown in Figs. 2 and 4. When the ends of the clamping strip 21 are thus secured rigidly in place, said strip exerts a resilient pressure against the edge of the glass for securing it firmly in position.

As shown in Figs. 3 and 4, the flange 14 may be relative wide and the strip or plate 21 may accordingly be of suitable width. In this instance the glass may be provided with end slots through which the screws or bolts 22 are adapted to extend. Thus upon loosening the screws or bolts, the glass may be caused to slide longitudinally and be clamped in adjusted position for varying the length of the ventilator from bracket to bracket.

Secured over the top edge of the glass there is the usual rubber sealing strip 23 adapted to embrace the top edge of the glass and engage the under top surface of the frame 10. It will be noted that in event the ventilator as shown in Fig. 3 is extended, the rubber sealing strip 23, which may be readily cut at any length, will fit snugly against the inner surface of the frame 10 immediately above the bracket so as to close any gap which may occur therein by such adjustment of the glass.

The invention claimed is:

1. A ventilator comprising a glass plate, an end bracket mounted at each end of said plate, said end bracket being provided with an inwardly turned flange portion along the side edge thereof, and an upwardly turned U-shaped portion at the bottom for receiving the glass plate, a resilient securing strip normally bowed inwardly toward the glass when mounted in position, and means for rigidly securing the ends of said strip to the bracket for compressing the bowed portion and resiliently forcing it in clamping position against said glass for firmly holding said glass in position against the flange portion of said bracket.

2. A ventilator comprising a glass plate, said glass plate being provided with a slot opening upon one end thereof, a bracket for securing said glass plate in position having a flange portion extending inwardly from the outer edge thereof, a glass plate clamping member positioned on the opposite side of said glass plate, and a bolt for securing said member to said flange portion, said bolt passing through the slot in said glass whereby said glass may be longitudinally adjusted with respect to said bracket.

3. A ventilator comprising a glass plate, said plass plate being provided with a slot opening upon one end thereof, a bracket for securing said glass plate in position having a flange portion extending inwardly from the outer edge thereof, a resilient securing member normally bowed out of a straight line, and means for securing said resilient clamping member against said glass so as to conform thereto, said securing member passing through the slot thereof so as to permit of the longitudinal adjustment of said glass with respect to said bracket.

In witness whereof, I have hereunto affixed my signature.

NEIL T. ALBRIGHT.